United States Patent
Yousseff

(10) Patent No.: US 7,424,109 B1
(45) Date of Patent: Sep. 9, 2008

(54) RAPID TRAINING ECHO CANCELLOR FOR TELECOMMUNICATIONS SYSTEM

(75) Inventor: Khalid Yousseff, Jersey City, NJ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/276,021

(22) Filed: Mar. 25, 1999
(Under 37 CFR 1.47)

(51) Int. Cl.
*H04M 1/00* (2006.01)

(52) U.S. Cl. .............. 379/406.04; 379/406.01; 379/406.06; 379/406.08

(58) Field of Classification Search ............ 379/406.08, 379/406.14, 406.01, 406.09, 406.1, 406.04, 379/406.06; 370/290
See application file for complete search history.

(56) References Cited

U.S. PATENT DOCUMENTS

| | | | | |
|---|---|---|---|---|
| 4,554,417 A * | 11/1985 | Boyer | ............... | 370/290 |
| 4,574,166 A * | 3/1986 | Gritton | ............... | 370/290 |
| 5,343,522 A * | 8/1994 | Yatrou et al. | ............ | 379/406.09 |
| 5,428,605 A * | 6/1995 | Andre | ............... | 370/290 |
| 5,566,167 A * | 10/1996 | Duttweiler | ............. | 379/406.14 |
| 5,610,909 A * | 3/1997 | Shaw | ............... | 379/406.08 |
| 5,631,899 A * | 5/1997 | Duttweiler | ............. | 379/406.08 |
| 5,815,496 A * | 9/1998 | Flanagan et al. | ....... | 379/406.04 |
| 5,815,568 A * | 9/1998 | Trump | ............... | 379/386 |
| 5,896,452 A * | 4/1999 | Yip et al. | ............... | 379/406.01 |
| 6,185,301 B1 * | 2/2001 | Muraoka | ............... | 379/406.08 |
| 6,493,448 B1 * | 12/2002 | Mann et al. | ............ | 379/406.01 |
| 6,580,793 B1 * | 6/2003 | Dunn et al. | ............ | 379/406.04 |
| 6,873,704 B1 * | 3/2005 | Park | ............... | 379/406.08 |

OTHER PUBLICATIONS

V.A. Margo et al. "Multiple Short-Length Adaptive Filters For Time-Varying Echo Cancellation", 1993 IEEE International Conference on Acoustics, Speech, and Processing, Apr. 27-30, 1993, pp. I-161-I-164.*

* cited by examiner

*Primary Examiner*—Jefferey F. Harold
(74) *Attorney, Agent, or Firm*—Blakely, Sokoloff, Taylor & Zafman LLP

(57) ABSTRACT

Plural echo cancellors each are tuned for different hybrid delays until it is established which echo cancellors are operating to cancel echos. The echo cancellors not so operating are then terminated.

11 Claims, 1 Drawing Sheet

RAPID TRAINING ECHO CANCELLOR FOR TELECOMMUNICATIONS SYSTEM

TECHNICAL FIELD

Figure 1:
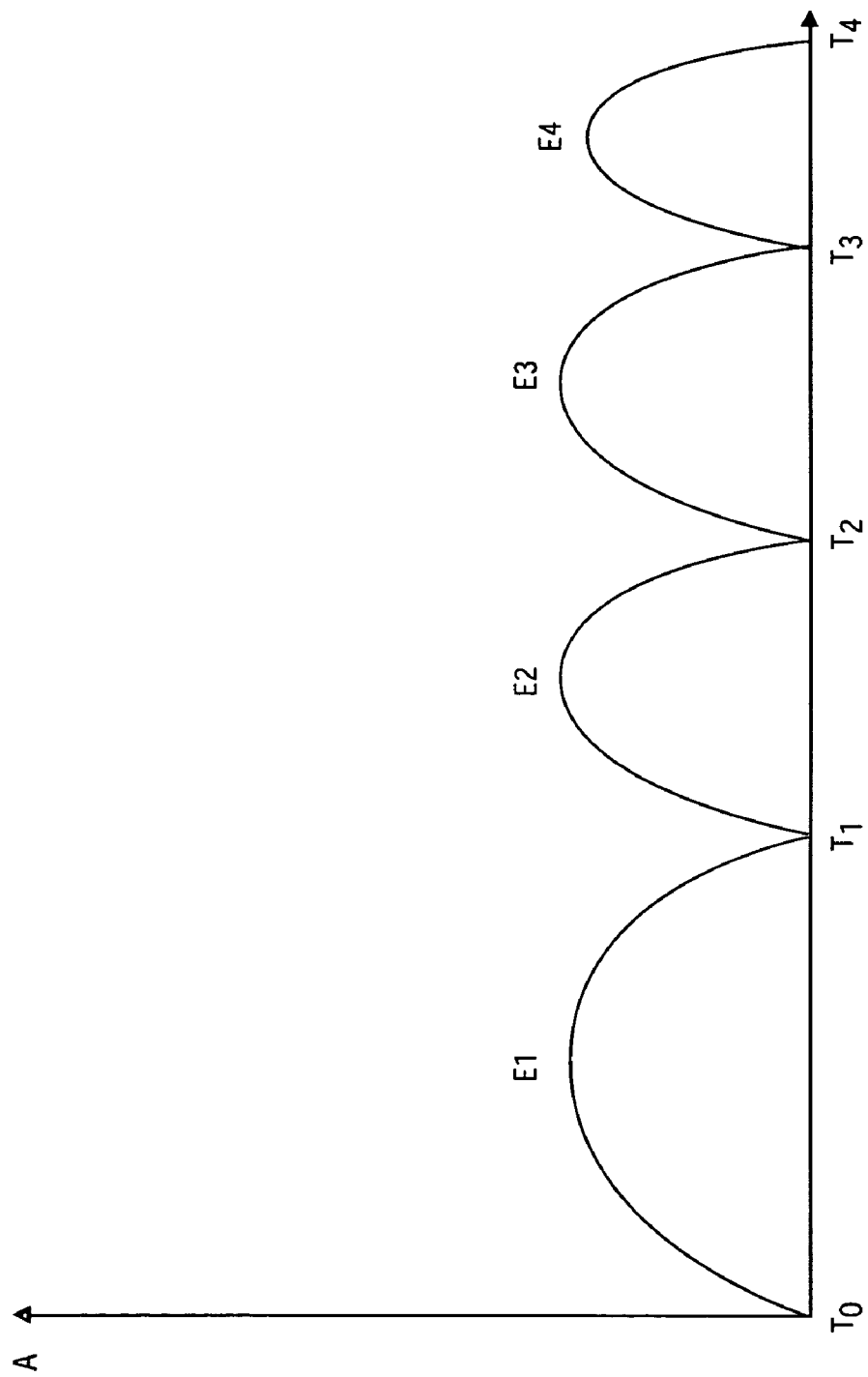

This invention relates to communications systems, and more particularly, to the design of a rapidly converging echo cancellor which utilizes time delay estimators in parallel to substantially simultaneously estimate the echo path delay of various sources of echo in a telecommunications system.

BACKGROUND OF THE INVENTION

Telecommunications systems, and particularly telephony systems, inherently include several sources of echo. Echo is created by the junction between the transmitting terminal and the telephone network, between the telephone network and the remote terminal, and at one or more places along the network. A standard requirement for such telecommunications systems is echo cancellation.

While echo cancellors vary greatly in complexity, design, and effectiveness, the basic idea behind the implementation of such echo cancellors is substantially the same. That is, at the source of the original signal (i.e. the transmitting terminal) an estimate of the echo is derived. The estimate is then subtracted from the actual echo being created by the system, resulting in the actual echo being canceled.

One major goal of all echo cancellors is to accurately estimate the actual system echo in as little time as possible. This process, known as training, should be as short as possible because during the training period, the echo cancellor is not functioning properly. Thus, the signal processing profession has put much effort into devising algorithms that can accomplish rapid training of echo cancellors.

A factor that complicates the training and the overall design of echo cancellors is that the echo originates from several different sources. The time it takes for the echo to travel from the location in the network at which it originates to the transmitting terminal must be accurately estimated. Since the echo is derived from several sources, echo arrives at the transmitting terminal at different times, and the amount of echo may be different for each of the several sources. Thus, the echo cancellor must train to cancel echo from different sources having different characteristics, all in a relatively small amount of time.

One prior art technique utilized to train an echo cancellor to cancel the multiple echoes discussed above is disclosed in the article "A DSP Based Long Distance Echo Cancellor Using Short Length Centered Adaptive Filters" to Marques et al. Marques discloses a set of echo cancellors that are used in combination with delay estimators. The delay estimator sweeps through various delays until it determines what is the delay that most accurately estimates the actual time that the echo takes to reach the transmitting terminal. The problem with such an approach is that it increases the time required for the echo cancellor to train. Specifically, for each source of echo, the entire set of possible delays must be scanned. This results in increased use of processing power, and extended training time.

In view of the above, there exists a need in the art for an improved technique of providing an echo cancellor that can rapidly train to cancel echoes from a plurality of sources in a telecommunications system. The training process should ideally require a relatively minimal amount of processing overhead.

SUMMARY OF THE INVENTION

The above and other problems of the prior art overcome in accordance with the present invention which relates to a technique for providing a rapidly converging set of echo canceling filters. In accordance with the teachings of the present invention, a plurality of relatively wide band echo canceling filters are initially arranged to cancel echoes of varying delays. After a predetermined and relatively short period of training, the echo cancellors that show no response are eliminated. The filters remaining are the filters that are centered at delays at which there is actual echo. These remaining filters then continue to operate and train in accordance with standard techniques of adaptive filter processing.

DETAILED DESCRIPTION OF THE PREFERRED EMBODIMENT

FIG. 1 shows a timeline representing various possible delays that an echoed signal can experience relative to the time that the original signal being echoed was transmitted. Each of the points T0 through T4 are separated by a distance of 16 milliseconds from the neighboring points. This separation has been found optimal for operating several independent echo canceling filters. In operation, each of the four echo cancellors E1-E4.

Each of the time periods T0 through T4 represents a window of time during which echo may originate. In accordance with the invention, a separate echo cancellor filter is set up within each of those time windows. The echo cancellors thus inherently train to cancel only echo arriving during the specified time window associated with the window about which each echo cancellor is centered. The windows may be the same or different widths.

Each of the echo cancellors operates independently. At the end of the specified training period, the echo cancellors will have trained to each include a set of coefficients, wherein each of the sets of coefficients is optimized to estimate and thus cancel the echo returning during that particular time frame.

At the end of the training period, it can be appreciated that each of the plural echo canceling filters will have its own set of coefficients that have been developed over the course of the 16 MS time training. Each of time band-widths represents cancellation of the echoes from a particular source. Thus, if the echo cancellation coefficients for a particular bandwidth are at or near zero, then that would imply that the echo coming back during that particular portion of the time is essentially zero.

In order to maximize the efficiency and save bandwidth, the magnitude of the coefficients is measured at the end of the training period. If the magnitude of all coefficients within a particular time bandwidth is below a predetermined value, then the system may assume that the echo arriving during that particular time frame is negligible. Accordingly, that particular echo cancellor is shut off.

The foregoing provides a technique of training a plurality of echo cancellors rapidly and in parallel. Additionally, echo cancellation capability that is directed to canceling very small or nonexistent echoes is quickly deactivated so that valuable resources are not wasted.

With respect to the particular echo canceling algorithm used within each time bandwidth, these are conventional and may consist of one or more algorithms that are known in the art of adaptive signal processing. The particular algorithm chosen to implement the echo cancellation is not critical to the present invention, and will not be discussed in detail.

The foregoing is exemplary only and is not intended for purposes of limitation. It is understood that the time bandwidths may change, the spacing between them may change, and other specific values used in the exemplary embodiment discussed herein may be different. These and other variations are intended to be covered by the following claims.

The invention claimed is:

1. Apparatus for canceling echoes over a communications channel, said apparatus comprising:
   - means for implementing, at the start of a communications session over a communications line, a plurality of echo cancellors to cancel echo on said communications line, said echo cancellors each operating to cancel echoes that arrive during a predetermined bandwidth of time, said predetermined band-widths of time being non-overlapping;
   - means for training each of said plurality of echo cancellors to produce a cancellation signal that cancels echoes arriving during the predetermined bandwidth of time associated with said echo cancellor; and
   - means for eliminating, after a predetermined training period, all echo cancellors that produce a cancellation signal below a predetermined threshold.

2. Apparatus of claim 1 wherein said bandwidths of time are equal in width to each other.

3. The apparatus of claim 2 wherein said non-overlapping bandwidths are each approximately 16 milliseconds apart.

4. The apparatus of claim 1 further comprising a graphical user interface for allowing a user to alter the predetermined threshold.

5. A method of canceling echoes in a telecommunications system comprising:
   - establishing a plurality of non-overlapping echo canceling filters;
   - training each of said non-overlapping echo canceling filters such that each produces a canceling signal within a predetermined time bandwidth;
   - eliminating all of said echo cancellors with the exception of those that produce a canceling signal above a predetermined threshold.

6. The method of claim 5 further comprising:
   - adjusting said predetermined threshold based upon results produced by said method of claim 5.

7. The method of claim 5 wherein each of said non-overlapping filters occupies a time width of approximately 16 milliseconds.

8. An apparatus comprising:
   - a plurality of echo cancellors to cancel echo on a communications line, the echo cancellors each operating to cancel echoes that arrive during a predetermined bandwidth of time, the predetermined bandwidths of time being non-overlapping; and
   - a control circuit in electrical communication with the plurality of echo cancellors to eliminate, after a predetermined training period, all echo cancellors that produce a cancellation signal below a predetermined threshold.

9. The apparatus of claim 8, wherein said bandwidths of time are equal in width to each other.

10. The apparatus of claim 8, wherein said non-overlapping bandwidths are each approximately 16 milliseconds in width.

11. The apparatus of claim 8, further comprising a graphical user interface for allowing a user to alter the predetermined threshold.

\* \* \* \* \*